United States Patent [19]

Gaita

[11] Patent Number: 4,681,350

[45] Date of Patent: Jul. 21, 1987

[54] QUICK COUPLING CONNECTION FOR HOSES

[75] Inventor: Giorgio Gaita, Correggio Emilia, Italy

[73] Assignee: G.F. S.r.l., Correggio Emilia, Italy

[21] Appl. No.: 807,698

[22] Filed: Dec. 11, 1985

[30] Foreign Application Priority Data

Aug. 2, 1985 [IT] Italy ................................ 34836/85[U]

[51] Int. Cl.⁴ ............................................ F16L 37/00
[52] U.S. Cl. .................................... 285/315; 267/182; 285/319; 285/316
[58] Field of Search ................ 285/315, 316, 319; 267/171, 180, 182

[56] References Cited

U.S. PATENT DOCUMENTS

| 2,604,315 | 7/1952 | Patterson | 267/182 |
| 3,847,393 | 11/1974 | Busselmeier | 285/315 |
| 4,216,782 | 8/1980 | Chow | 285/315 |
| 4,219,222 | 8/1980 | Brusadin | 285/319 |
| 4,373,753 | 2/1983 | Ayers et al. | 285/319 |
| 4,429,906 | 2/1984 | Spadotto et al. | 285/315 |

FOREIGN PATENT DOCUMENTS 261287 4/1968 Austria ................................. 285/315

Primary Examiner—Richard J. Scanlan, Jr.
Assistant Examiner—Eric K. Nicholson
Attorney, Agent, or Firm—Brisebois & Kruger

[57] ABSTRACT

An instant coupling comprises a male element and a female element which are locked together by two teeth (19) supported by flexible strips (18), which are normally in the disengagement position but urged into the engagement position by the action of an axially slidable outer collar (12), which is itself maintained in said engagement position by annular elastic elements (20) interposed between the strips (18).

1 Claim, 6 Drawing Figures

QUICK COUPLING CONNECTION FOR HOSES

This invention relates to improvements in instant couplings for hoses, in which the male element of the coupling is engaged by two teeth, which are designed to project into the inner zone of the female element through convenient apertures for the said purpose of engaging the male element, and to withdraw from the inner zone of said female element in order to release the male element.

BACKGROUND OF THE INVENTION

Couplings are for example known comprising a male element and a female element as stated, plus an elastically deformable element which embraces the female element, said elastically deformable element being itself embraced by an axially slidable release collar. In such couplings, the female element also comprises two diametrically opposing identical apertures through which two locking teeth associated with said elastically deformable element are permanently inserted. In the known prior art, this latter element comprises two opposing semicircular members provided with said two teeth which project inwards, the facing ends of said semicircular members being connected together by two thin open-ring sections which are bent at an angle back upon themselves along a middle axis so that their concavities face towards the outside of the coupling.

An elastically deformable element of the aforesaid type is described in Italian patent application No. 23847 A/80, which corresponds to U.S. Pat. No. 4,429,906, to which reference should be made for further details.

With the structure described in said document, when the elastically deformable element is made to embrace the female element, the two teeth are elastically urged towards the longitudinal axis of the coupling, and partially penetrate into the female element, said open-ring sections, which act as springs, keeping the collar elastically urged into its locking position, by way of the semicircular members from which the teeth branch. As the male element is inserted into the female element, which is done without sliding the column, the two teeth are forced outwards by said male element until they make contact with the inner surface of the collar, to then rotate about their point of contact with this latter, and finally project towards the inside of the female element when they become aligned with an engagement groove provided in the male element.

When the male element is to be removed, the collar is moved against the thrust of the elastic element, so that said collar engages with said semicircular members and also drags the teeth, which make contact with the inclined lower edge of the apertures provided in the female element. Because of said inclined or sliding edge, the teeth withdraw from said apertures until the male element is completely freed and can therefore be withdrawn, the collar on being released automatically returning to its locking position.

The use of the aforesaid known couplings has shown that they have a tendency to wear with a certain rapidity in the zones in which the major sliding action occurs, in particular at the surfaces of the teeth and apertures which undergo the said contact during the release of the male element.

With the continual repetition of the release operations, the degree of wear of said surfaces increases correspondingly, and consequently the release becomes particularly difficult and uncomfortable to effect, with the final danger of irreversible engagement.

SUMMARY OF THE INVENTION

The main object of the present invention is to provide and protect an improved coupling which obviates the aforesaid drawback by means of a simple and rational structure.

This is attained according to the invention by disposing the teeth or hooks such that their disengagement is not forcibly effected by sliding the collar towards the release position, but takes place spontaneously by simple mutual withdrawal of the two teeth, which are free to withdraw by virtue of the elastic action of their own support when the collar reaches said release position.

The structure which satisfies this object comprises, according to the invention, a circular ring which is mounted over that cylindrical portion of the female element in which the two diametrically opposing apertures are provided, and is provided with two longitudinal elastic bars or springy strips, which support the teeth for insertion through said apertures, and are preformed so as to keep the teeth constantly urged elastically outwards, such that they constantly rest against the inner surface of the release collar.

As stated, the purpose of this latter is not to forcibly effect the withdrawal of the teeth from the apertures, but to operate as a simple counteracting member for retaining the teeth in their engaged position, whereas it allows them to freely withdraw when it is moved into the release position.

For this purpose the collar is provided with two inner protuberances arranged to maintain the teeth in their engaged position, and at the mouth end of the female element said collar comprises a widened portion in which the teeth automatically become disposed when the collar is in its release position.

The aforesaid characteristics mean that the heavy sliding of the aforesaid prior art is prevented, with simultaneous elimination of the said problems.

Finally, according to the invention, there are associated with the said circular ring two further diametrically opposing elastic means which are interposed between said springy strips, but in contrast to these latter instead of acting radially outwards they act longitudinally in order to keep the collar elastically loaded when in its release position.

Said two further elastic means assume the form of two elliptical rings which are arched about their major axis so as to embrace an ideal cylindrical surface situated in proximity to the inner surface of the collar, where respective resting projections are provided for said elastic means.

The characteristics and constructional merits of the invention will be more apparent from the detailed description given hereinafter with reference to the figures of the accompanying drawings.

DETAILED DESCRIPTION

Figure 1:
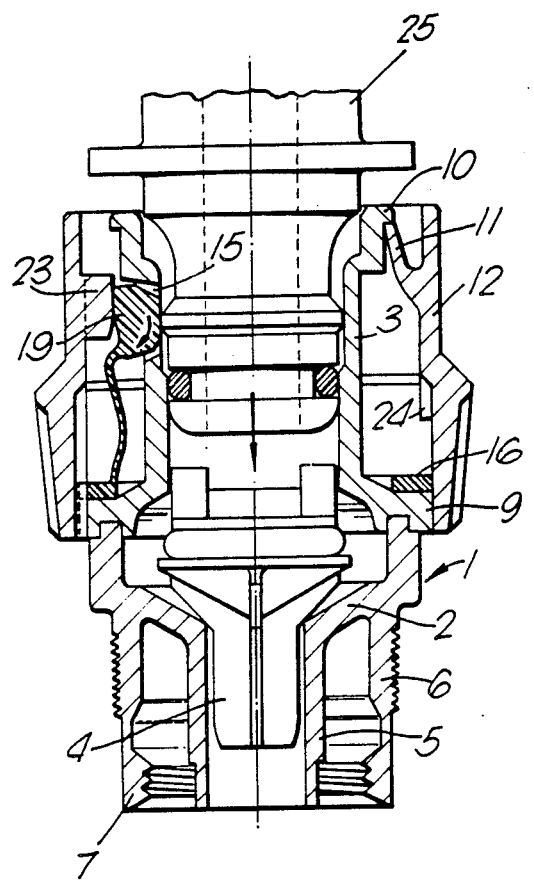
FIG. 1 is a longitudinal section through the coupling of the invention on two orthogonal planes, showing the coupling during the insertion of the male element.
Figure 2:
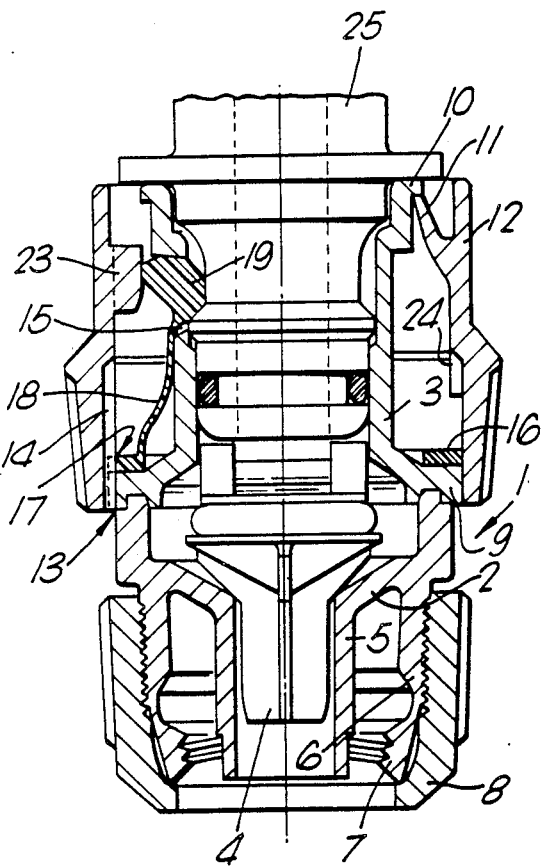
FIG. 2 is a view similar to the preceding, but with the male element fully inserted and locked.
Figure 3:
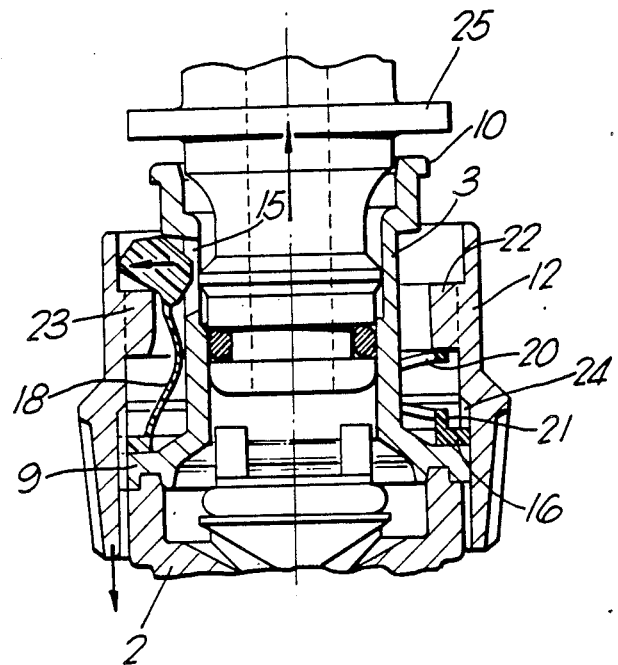
FIG. 3 is a view similar to the preceding, showing the coupling of the invention during the extraction of the male element.

Said figures, and in particular FIGS. 1, 2 and 3, show a female element 1 comprising a connection portion 2 and a receiving portion 3, both of cylindrical shape but of different cross-sections, and between which there is defined a chamber slidably housing a water flow stop valve 4, this latter being caused to close by the water itself when the male element is withdrawn from the coupling.

Said connection portion 2 comprises a hollow cylindrical stem 5 through which the water passes and which acts as a guide for the valve 4, and an externally threaded surrounding skirt (FIG. 1), which terminates in a circumferential series of internally toothed longitudinal tongues 7. These are elastically deformable and are forced to bend inwards by a ring nut 8 screwed onto the skirt 6, so as to retain a water feed hose (not shown), which is to be mounted on said stem 5.

As clearly shown in said figures, the receiving portion 3 of the female element 1 comprises a cylindrical member with a lower circumferential ledge 9 and an upper circumferential lip 10, this latter acting as an abutment for a circumferential series of tongues 11 provided internally on the upper mouth of a slidable collar 12 mounted over said receiving portion 3.

Figure 4:
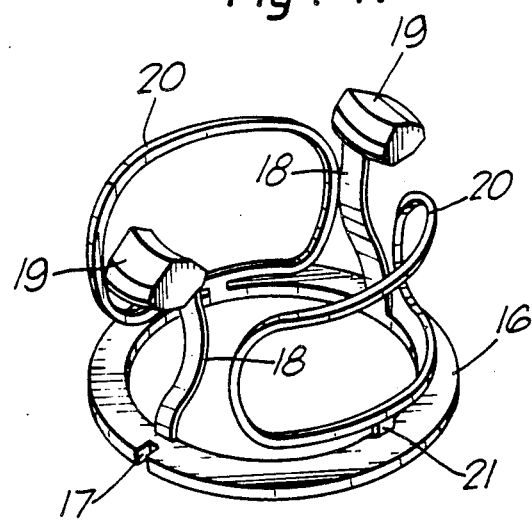
FIG. 4 is an isometric view showing the elastically deformable element proposed for locking/releasing the male element.
Figure 5:
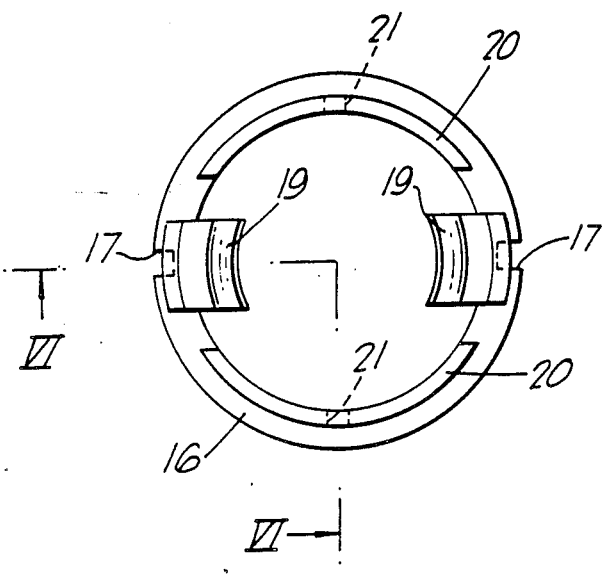
FIG. 5 is a plan view of this latter.

Said collar 12 is mounted practically as an exact fit over said ledge 9, which is provided with two small diametrically opposing longitudinal grooves 13 which slidably receive two inner longitudinal ribs 14 acting as antirotational elements for the collar 12. Towards the end comprising the lip 10, the female element 1 is provided with two diametrically opposing apertures 15 (FIG. 3), and between the female element 1 and collar 12 there is provided an elastically deformable profiled member which is described with reference to the accompanying FIGS. 4 to 6.

Said profiled member, constructed of a convenient synthetic material, comprises a circular base ring 16 designed to rest on the ledge 9 (FIGS. 1 to 3) and provided in diametrically opposing positions with two cavities 17 arranged to engage with the said ribs 14. Two thin strips 18 extend upwards from the inner edge of the inner face of said ring 16 from positions corresponding with said two cavities, and are upperly provided with respective profiled engagement teeth 19.

Figure 6:
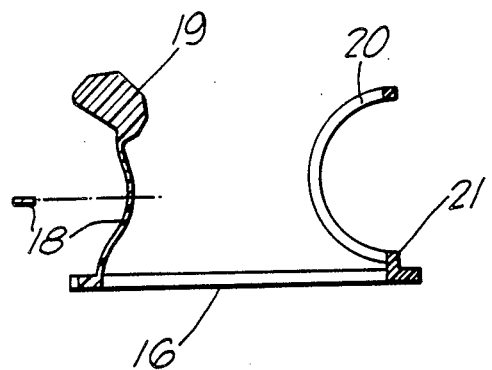
FIG. 6 is a section on the line VI—VI of FIG. 5.

With reference to the accompanying FIGS. 6 and 3, it can be seen that the strips 18 are preformed in such a manner that when the two teeth 19 are free, the distance between them is greater than the inner diameter of the portion 3 containing the apertures 15 which receive said teeth 19. Basically, the strips 18 act as leaf springs as will be apparent hereinafter.

The said elastically deformable member also comprises two elliptical rings 20 interposed between said strips 12 and fixed to the base ring 16 by respective feet 21.

Said elliptical rings 20 are disposed with their major axis parallel to the ring 16, and are arched (FIGS. 3, 4, 6) about said major axis so as to embrace an ideal cylindrical surface having a diameter greater than the outer diameter of the receiving portion 3 of said female element (FIG. 3).

The rings 20 are also designed to make contact from below with two diametrically opposing projections 22 provided inside the collar 12 (see FIG. 3), in order to keep this latter elastically urged into the locking position determined by the elements 10 and 11 (FIG. 2).

Inside the said collar 12 there are also provided two diametrically opposing protuberances 23 interposed between the said projections 22, in order to act as retention/release elements for the teeth 19, as clearly shown in FIGS. 2 and 3.

Finally, in the inner intermediate zone of said collar 12 there is provided a circumferential series of small equidistant longitudinal projections 24, which abut against the circular ring 16 in order to define the maximum rearward travel of the collar 12, to prevent excessive deformation of the rings 20.

The coupling also comprises a male element 25 of known type, which is provided with a normal outer seal gasket and a likewise normal outer circumferential groove for receiving the teeth 19.

During insertion of the male element 25, the collar 12 (FIG. 1) is left in its locking position, with the protuberances 23 opposing the elastic action of the strips 18 to keep the teeth 19 inserted through the apertures 15 and partly into the receiving portion 3 of the female element 1.

During this insertion stage, the male element 25 acts on the teeth 19 to cause them to rotate about their points of contact with the protuberances 23, with simultaneous elastic deformation of the strips 18, and complete emergence of the teeth 19 from the apertures as clearly shown in FIG. 1.

When the circumferential groove of said male element 25 becomes aligned with the apertures 15 (see FIG. 2), the teeth automatically become repositioned as at the commencement of the insertion stage, with simultaneous engagement of the male element 25.

Finally, in order to release this latter it is necessary only to pull the collar 12 in a direction away from lip 10, to the position shown at FIG. 3, against the elastic thrust of the rings 20, so that the protuberances 23 become disposed below the teeth 19 to release them, and the strips 18, which are no longer retained, extract the teeth 19 from the respective apertures as shown in FIG. 3.

The advantages of the invention are apparent from the aforegoing description.

I claim:

1. In a quick coupling connection of the type comprising a male element with an outer engagement groove; a receiving portion in the form of a female element to axially receive the male element and provided with two diametrically opposing apertures; an axially slidable collar which embraces the receiving portion of the female element; and interposed between said female element and collar, two teeth, which are inserted into the apertures of the female teeth radially outwardly into engagement with an inner surface of the collar, and wherein the elastic means comprise, two identical annular elements interposed between said strips and in the form of an ellipse with its major axis orthogonal to the axis of the coupling, said annular elements each curving about its major axis, said strips and annular elements being connected to a common circular base ring resting on a widened part of the receiving portion, respective projections on the inner surface of the collar against which said elliptical elastic elements press, and proturberances on said collar for retaining the teeth in their locking position, said collar having beyond said proturberances, widened spaces into which the teeth are inserted by the strips when the teeth are released from the projections.

* * * * *